(12) United States Patent
Flynn

(10) Patent No.: US 8,005,584 B1
(45) Date of Patent: Aug. 23, 2011

(54) ACOUSTIC COMMAND LINK TO RETRIEVE SUBMERGED FLIGHT DATA

(76) Inventor: Owen E. Flynn, Columbia, MD (US)

( * ) Notice: Subject to any disclaimer, the term of this patent is extended or adjusted under 35 U.S.C. 154(b) by 0 days.

(21) Appl. No.: 12/800,632

(22) Filed: May 19, 2010

Related U.S. Application Data

(60) Provisional application No. 61/242,681, filed on Sep. 15, 2009.

(51) Int. Cl.
*G06F 7/70* (2006.01)

(52) U.S. Cl. ........................................................ 701/14

(58) Field of Classification Search .................. 701/3, 9, 701/14; 340/945, 963, 971; 367/2
See application file for complete search history.

(56) References Cited

U.S. PATENT DOCUMENTS

| | | | |
|---|---|---|---|
| 7,640,083 B2 * | 12/2009 | Monroe | 701/9 |
| 2003/0135327 A1 * | 7/2003 | Levine et al. | 701/220 |
| 2004/0027255 A1 * | 2/2004 | Greenbaum | 340/945 |
| 2009/0238363 A1 * | 9/2009 | Tronel et al. | 380/239 |

* cited by examiner

*Primary Examiner* — Yonel Beaulieu

(57) ABSTRACT

Presently the only way to obtain the flight data from an open ocean crash site is to physically retrieve the flight data recorder. Retrieving a flight data recorder from the sea floor is extremely complex and expensive, requiring remotely operated robotic devices to locate and then to physically bring a piece of wreckage to the surface. In some cases water depth may preclude any retrieval. In these cases the flight data recorder will not be recovered and the cause of the crash will never be known. What is needed, however, is not the flight data recorder but the flight data. The invention provides a safe, convenient and economical way to retrieve flight data from a submerged flight data recorder without having to physically retrieve the recorder hardware.

2 Claims, 4 Drawing Sheets

ACOUSTIC COMMAND LINK TO RETRIEVE SUBMERGED FLIGHT DATA

RELATED APPLICATION

The present non-provisional application is based upon Provisional Application No. 61/242,681 filed Sep. 15, 2009, the subject matter of which is incorporated herein by reference.

BACKGROUND OF THE INVENTION

Field of the Invention

Presently the only way to obtain the flight data from an open ocean crash site is to physically retrieve the flight data recorder. Retrieving a flight data recorder from the sea floor is extremely complex and expensive, requiring remotely operated robotic devices to locate and then to physically bring a piece of wreckage to the surface. In some cases water depth may preclude any retrieval. In these cases the flight data recorder will not be recovered and the cause of the crash will never be known. What is needed, however, is not the flight data recorder but the flight data.

SUMMARY OF THE INVENTION

The invention allows retrieval of the flight data acoustically over an acoustic command link. The acoustic path to the surface ship that has located the crash site has already been established by the location pinger on the data recorder. The surface ship then transmits an acoustic command signal to the recorder, which recognizes it and then begins sending the flight data to the ship acoustically for recording and subsequent analysis.

The underwater location beacon on present flight data recorders is a self contained unit that begins sending an acoustic ping at regular intervals once a sea water sensor is activated. It has no capability to receive signals, only to send. This will be replaced by a wideband transducer that will allow, by means of a transmit/receive control unit, the transmission of a ping interval followed by a listening interval. During the listening interval the recorder listens for a known command signal from the surface ship. Once it recognizes the acoustic command, the system controller will terminate the transmission of location pings and will start the process of extracting the data from the memory unit to begin sending the data to the surface acoustically.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
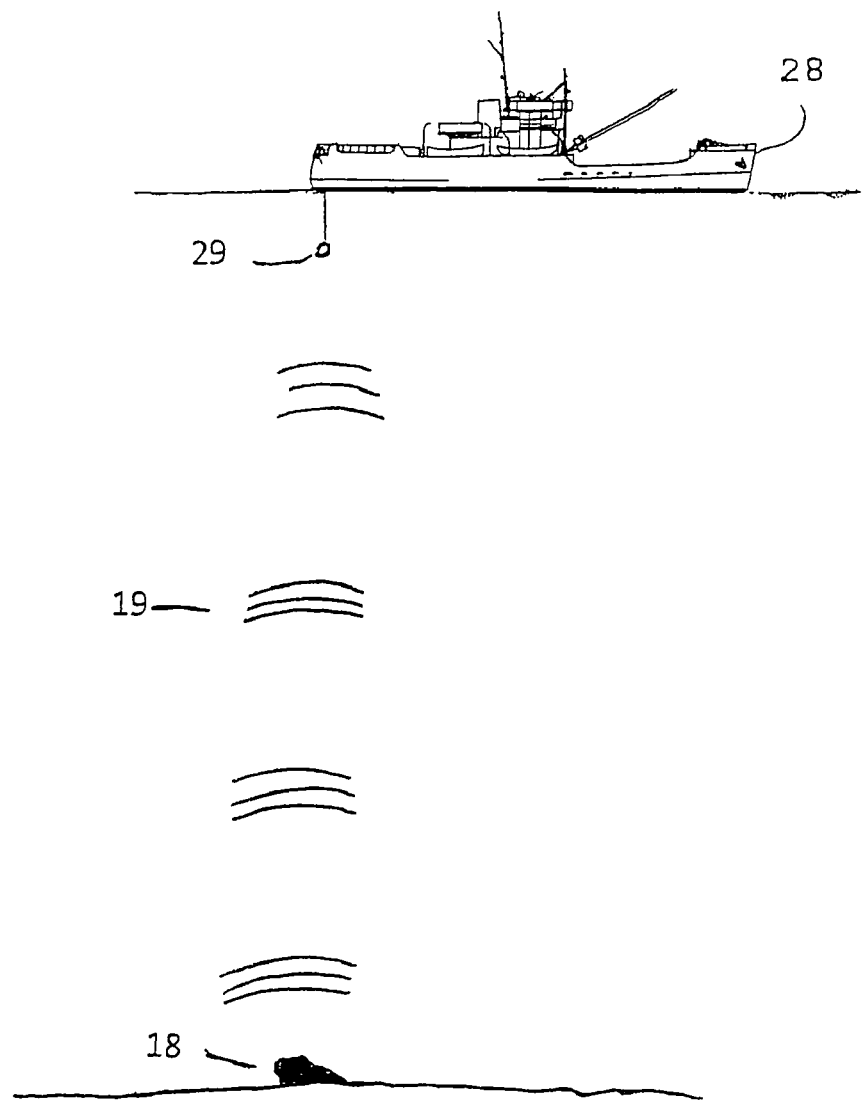
FIG. 1 is an illustration of an acoustic command link to retrieve submerged flight data constructed in accordance with the principles of the present invention, the link sending pings and alternately listening.

FIG. 1 illustrates the process by which the surface ship (28) locates the crash site. Once the sea water sensor is activated the flight data recorder (18) begins transmitting location pings (19) at regular intervals. Each transmission interval is followed by a listening interval. The surface ship tows an acoustic transducer (29) through which it can receive the location pings from the flight data recorder to localize the recorder. It homes in on the location signals to be in a position which is directly over the site of the flight data recorder.

Figures 2, 3:
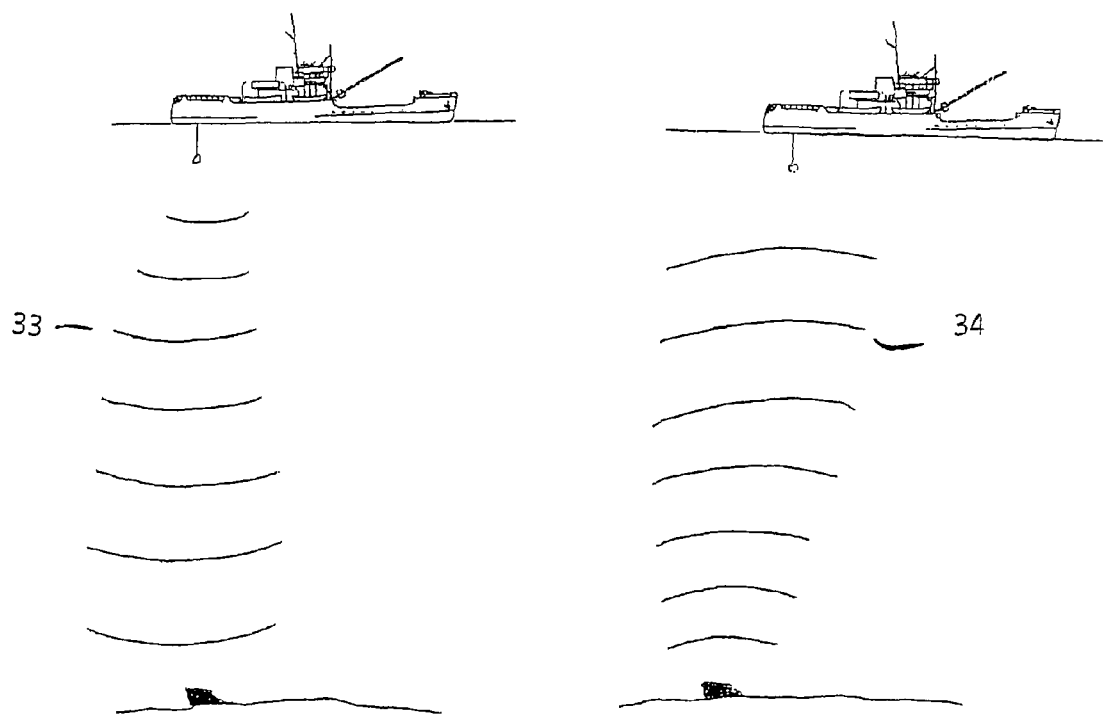
FIG. 2 illustrates the surface ship sending the acoustic command to the recorder.
FIG. 3 is an illustration similar to FIG. 2 but with the link transmitting flight recorder data to the surface ship.

The towed transducer is also used to transmit the acoustic command signal (33) to the flight data recorder commanding it to send the flight data to the surface. This is illustrated in FIG. 2.

Once the command signal is recognized the location pinger function is disabled and the system is configured to allow data from the memory to be transmitted to the surface acoustically (34). The data is received through the towed transducer and is recorded aboard the ship for later analysis. This is illustrated in FIG. 3.

Figure 4:
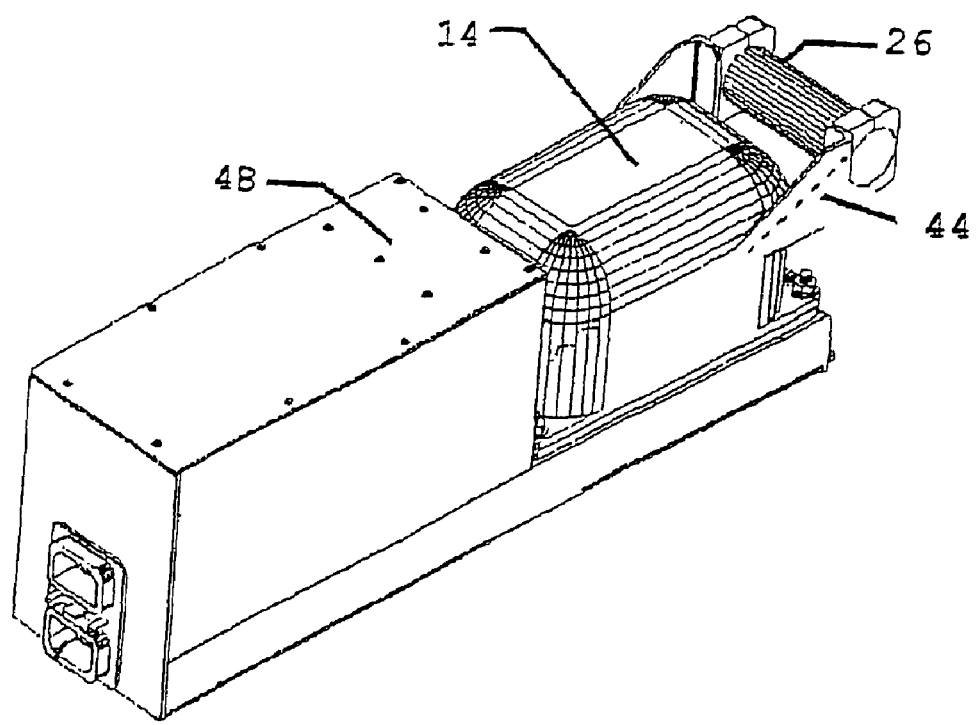
FIG. 4 is a perspective showing of the flight data recorder and its associated components illustrated in FIGS. 1, 2 and 3.

FIG. 4 is a drawing of the flight data recorder hardware.

The invention replaces the present location beacon with a wideband transducer (26) capable of sending and receiving underwater acoustic signals. The existing system configuration has the location beacon as a standalone unit with no electrical interface to the flight recorder electronics (14). The invention provides an electrical interface from the electronics to the wideband transducer (44). Once activated by a seawater sensor it transmits an interval of pings followed by a listening period. It stays in this mode until the search vessel has located it and sends down the command to begin sending data. At this point the transducer ceases the location pinging and is ready to begin sending data to the surface.

Figure 5:
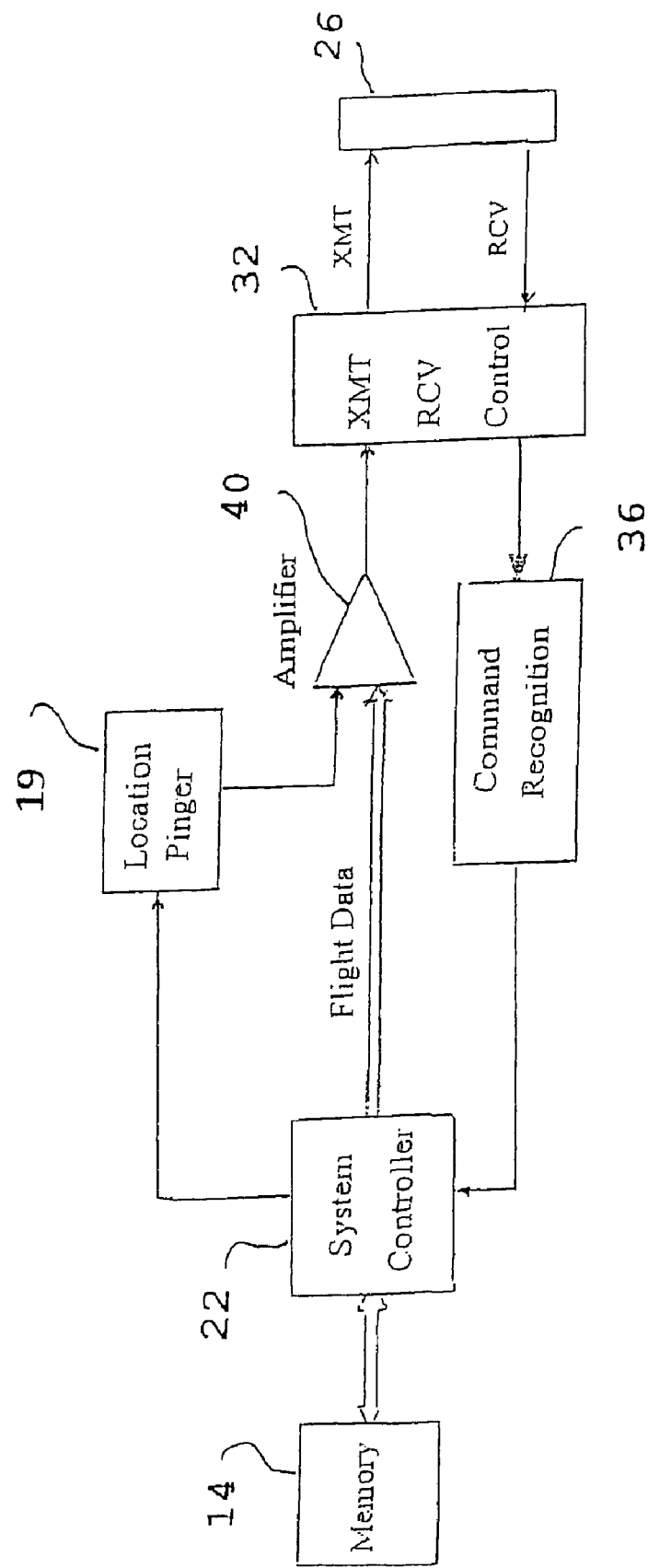
FIG. 5 is an electrical schematic of the acoustic link illustrated in the prior Figures.

FIG. 5 illustrates the functional changes to the existing flight data recorder to achieve the capability provided by the invention. The transmit/receive unit (32) controls whether the system is in transmit mode or receive mode. It interfaces directly with the transducer and drives the transducer with the location pings followed by an interval in receive mode when it listens for the command signal. Once the command is received and is recognized (36) in the receive mode, the system controller (22) commands the memory (14) to begin transmitting the flight data to the surface acoustically. It does this through an amplifier (40) which provides the signal strength for the acoustic transmissions to be clearly received at the surface.

DETAILED DESCRIPTION OF THE INVENTION

The invention provides a safe, convenient and economical way of obtaining data from a flight data recorder which is located on the sea floor as a result of an open ocean plane crash. Presently the only way to retrieve the flight data is to physically retrieve the flight data recorder hardware from the wreckage.

With reference to FIG. 1 the first step in retrieving the data is to locate the position of the flight data recorder. This is presently done by means of a surface ship towing an underwater transducer which homes in on the acoustic pings sent by the underwater location beacon on the flight data recorder. The invention replaces the existing underwater location beacon which can only transmit with a wideband transducer which gives the capability to both transmit and receive. Once the surface ship has located the site and is directly over the flight data recorder the invention provides for an acoustic command signal that is transmitted through the towed transducer to the flight data recorder. This is illustrated in FIG. 2.

Once the command signal is recognized the location pinger function is disabled and the system is configured to allow data from the memory to be transmitted to the surface. The data is received through the towed transducer and is recorded aboard the ship for later analysis. This is illustrated in FIG. 3.

FIG. 4 illustrates the flight data recorder hardware. The present standalone underwater location beacon is replaced by a wideband transducer (26) which can receive as well as transmit underwater acoustic signals. The invention also provides an electrical interface (44) from the transducer to the flight data recorder electronics (14). The power supply for the electronics is also shown (48).

FIG. 5 shows the functional changes provided by the invention. Once the system is activated by a sea water sensor, location pings are transmitted to the surface at regular intervals. The location ping intervals are followed by listening intervals whereby the system listens for an acoustic command from the surface.

The invention provides an electrical interface between the wideband transducer and the electronics. The invention provides a transmit/receive control unit (32) which determines whether the system is in a transmit mode or in a receive listening mode. Initially it is in transmit mode where the system controller (22) activates the location pinger (19) which provides, through an amplifier to the transducer, the location pings necessary for the surface ship to locate the flight data recorder. Each location ping is followed by a listening interval when the transmit/receive unit is switched to receive mode.

After locating the site, the surface ship through its towed transducer sends down an acoustic command signal. In the receive mode the flight data recorder receives the command signal from the surface ship. The invention provides a command recognition capability which recognizes the command from the surface. Once the command is recognized by the command recognition unit (36) a signal is sent to the system controller which then places the system in the mode to begin sending data to the surface. First the location pinger (19) is disabled. Then the system controller commands the memory (14) which contains the flight data to begin the process which will allow the data to be sent to the amplifier and then through the transducer to the surface.

The invention is comprised of a plurality of components.

Such components in their broadest context include a memory, a location pinger, a command recognition unit, a system controller, a transmit control unit, an amplifier, a wideband transducer and a command signal.

First provided is a memory (14). The memory is adapted to receive and store flight related data. The memory is further adapted to, upon command to transmit the stored data. A location pinger (19) is provided. The location pinger is adapted to, upon command to send out location pings. The pinging signal is alternated with a listening mode. The location pinger is adapted to be activated upon being submerged in water.

Provided next is the command recognition unit (36). It receives signals during the listening interval and compares these inputs with the known command signal that will be sent from the surface. Once it recognizes the command signal it sends a signal to the system controller.

Provided next is a system controller (22) which is operatively coupled to the location pinger. The system controller is in two-way communication with the memory. When the command recognition function signals that it has received the command signal, the system controller terminates the location pinger and commands the memory to begin sending the data to the surface.

Provided next is a transmit/receive control unit (32) which determines whether the system is in transit mode or in a receive listening mode. In the transit mode it couples the output of the amplifier to the transducer. The input to the amplifier is both the location pinger signal and the output from the memory. During the location pinger intervals the location signals from the locator pinger are sent to the transducer while the input from the memory is disabled. Once the command signal from the surface is recognized, the locator input is disabled and the memory input is activated to allow the memory data to be coupled directly to the transducer for transmission to the surface.

Provided next is an amplifier (40) which amplifies the signals to provide the necessary signal strength for the acoustic transmissions to be clearly received at the surface.

Provided next is a wideband transducer (26) which converts electrical signals into acoustic signals in transmit mode and converts acoustic signals to electrical signals in receive mode. Next provided is the command signal (33) which will have a characteristic that will be clearly recognized by the command recognition unit.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An acoustic command link to retrieve submerged flight data acoustically comprising:
   a memory adapted to continuously receive and store flight related data and upon command to transmit the stored flight related data;
   a location pinger adapted to send out an acoustic pinging signal alternating with a listening interval;
   a system controller operatively coupled to the pinger and adapted to terminate functioning of the pinger in response to a known input, the system controller being in communication with the memory; and
   a wideband transducer operatively coupled to the pinger and to the system controller, the transducer adapted to send acoustic information to and receive acoustic information from a surface ship, the sent information including the stored flight related data from the memory.

2. An acoustic command link to retrieve submerged flight data from a submerged flight data recorder comprising in combination:

a memory (14) adapted to receive and store flight data and upon command to transmit the stored flight data;

a location pinger (19) adapted to send out a location pinging signal, alternating with a listening interval, the location pinger is adapted to be water activated when submerged in water;

a command recognition unit (36) which receives signals during the listening intervals and compares these inputs with a known command signal that will be sent from the surface, once the command recognition unit recognizes the command signal, the command recognition unit sends a signal to a system controller;

a system controller (22), which is operatively coupled to the location pinger and is also in two-way communication with the memory, whereby when the command recognition unit signals that the command recognition unit has received the command signal, the system controller terminates the location pinger operation and commands the memory to begin sending the flight data to the surface;

an amplifier (40) which amplifies the signals to provide the necessary signal strength for the acoustic transmissions to be clearly received at the surface, the amplifier is adapted to receive the pinging signal from the location pinger and to receive the flight data transmissions from the memory, the amplifier is also adapted to preclude transmissions of flight related data until the termination of the pinging signal;

a transmit/receive control unit (32) adapted to provide transmit data to the transducer for transmission to the surface and to provide receive data from the transducer to the command recognition unit;

a wideband transducer (26) operatively coupled to the amplifier through the transmit/receive control unit when in the transmit mode, the wideband transducer operatively coupled to the command recognition unit when in receive mode, in the transmit mode, the wideband transducer converts the electrical signals into acoustic signals for transmission to the surface, in receive mode the wideband transducer converts acoustic signals from the surface into electrical signals for processing; and an acoustic command signal (33) that is transmitted from a towed transducer from the surface ship, commanding that the flight data be sent to the surface acoustically.

* * * * *